March 3, 1931. R. SMITH 1,794,800
GRAPEFRUIT CORER AND SLICER.
Filed Oct. 31, 1928
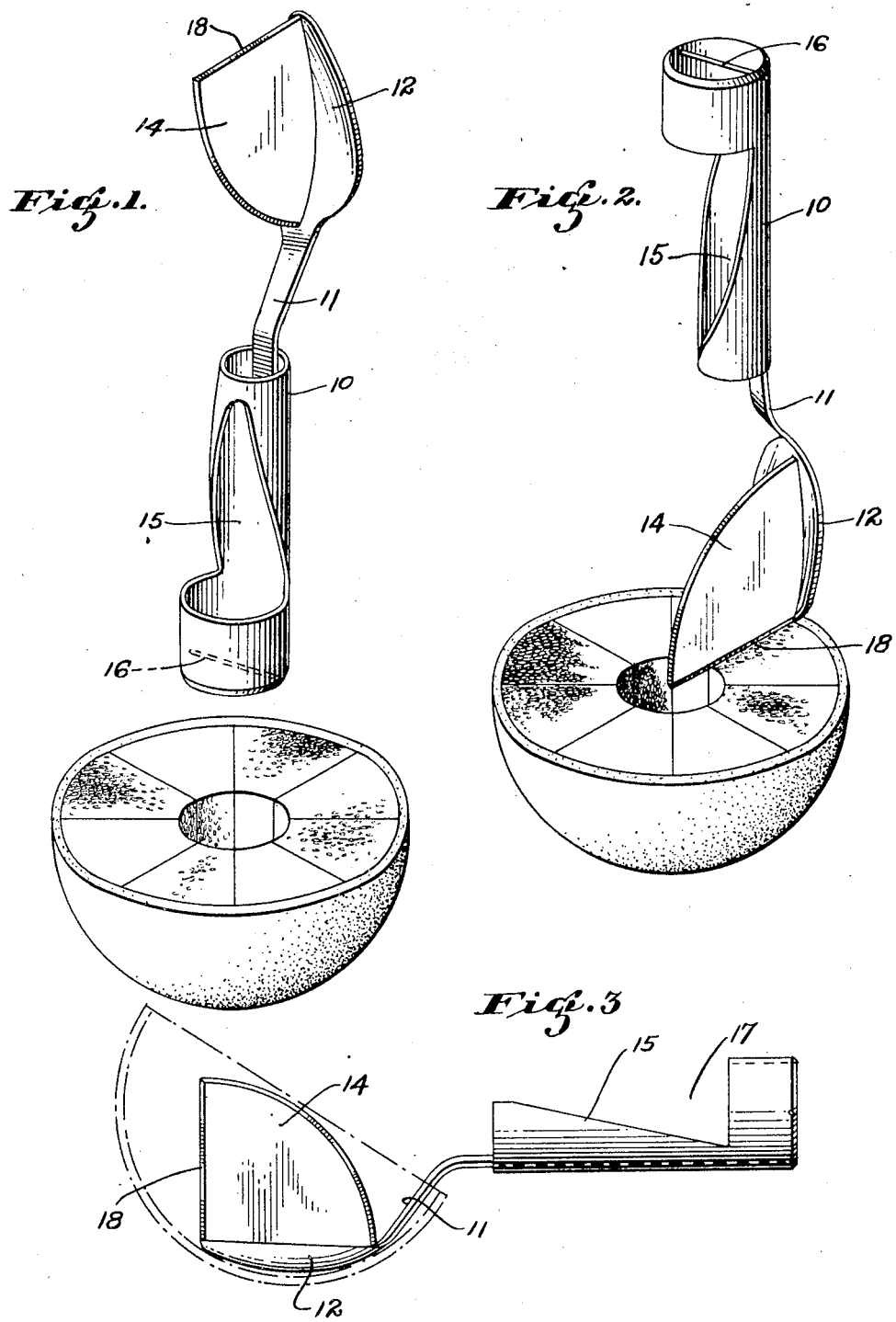
INVENTOR.
RALSTON SMITH.
BY
Tounsend, Loftus & Hett.
ATTORNEYS.

Patented Mar. 3, 1931

1,794,800

UNITED STATES PATENT OFFICE

RALSTON SMITH, OF OCEAN PARK, CALIFORNIA

GRAPEFRUIT CORER AND SLICER

Application filed October 31, 1928. Serial No. 316,121.

This invention relates to culinary implements and particularly pertains to a device for coring and slicing grapefruit.

It is the principal object of the present invention to provide a simple and inexpensive device adapted for use in expeditiously coring and slicing grapefruit and separating the pulp thereof from the rind.

In carrying out this object into practice, I provide an elongated implement having a coring device at one end to remove the core from a grapefruit and with a slicing device at the other end. The slicing device is so designed that it simultaneously slices the fruit and separates the slices from the rind.

One form which the invention may assume is exemplified in the following description and illustrated by way of example in the accompanying drawings, in which:

Fig. 1 is a perspective view of a grapefruit coring and slicing device embodying the preferred form of my invention and illustrating it in the position it assumes when utilized to core a grapefruit.

Fig. 2 is a perspective view showing the manner in which the device is used to slice the fruit.

Fig. 3 is a side elevation of the device.

Referring more particularly to the accompanying drawings, 10 generally indicates a grapefruit coring and slicing device which comprises a flat curved or offset shank 11 which terminates at one end in a spoon-shaped blade 12. A slicing blade 14 projects at right angles from the center of the spoon-shaped blade 12 as illustrated. The slicing blade 14 is arranged centrally and longitudinally of the spoon-shaped blade 12 as will be seen from Figs. 2 and 3.

At the opposite end of the shank 11 is a tubular device 15 which is of a diameter that it may be used as a handle to operate the device. The outer end of the tubular handle 15 is sharpened so that the handle may be projected endwise into the center of the grapefruit as illustrated in Fig. 1 to separate the core from the pulp.

A cutting member 16 is arranged transversely of the cutting end of the handle 15 at a point closely adjacent to the cutting edge thereof. This cutting member 16 is arranged diametrically as illustrated in Fig. 1. The function of the cutting member 16 is to separate the core from the rind after the handle has been projected into the grapefruit, separating the core from the pulp.

A portion of the handle is cut away as at 17 so that the core separated from the grapefruit may be readily removed from the handle.

In operation of the device, to core the fruit the handle is projected endwise into the fruit as illustrated in Fig. 1 and the cutting edge of the handle acts to separate the core from the fruit. When the cutting edge of the handle reaches the rind, the handle is revolved so that the cutting member 16 will separate the core from the rind, enabling the core to be removed from the fruit.

To slice the fruit, the device is arranged relative to a half a grapefruit as shown in Fig. 2 where the spoon-shaped blade is illustrated as arranged at the meeting point between the pulp and rind and the straight cutting edge 18 of the blade 14 is arranged radially of the fruit. The blades are then forced downwardly with the spoon-shaped blade 12 following the inner contour of the rind. During this operation the grapefruit will be both sliced and the pulp separated from the rind.

From the foregoing it is obvious that I have provided a very simple and inexpensive device which is capable of use in expeditiously coring and slicing grapefruit.

It is to be understood, however, that either of the devices here disclosed and which are combined into a single instrument may be used separately without departing from the invention.

It is to be also understood that various changes in its construction may be made by those skilled in the art without departing from the spirit of the invention as defined in the appended claims.

Having thus described my invention, what I claim and desire to secure by Letters Patent is:

1. A grapefruit coring and slicing device comprising a shank, a tubular handle extending from one end of the shank, the outer extremity of said handle terminating in a sharpened end, a blade fixed to the other end of the shank extending in the same direction as the shank and adapted to be inserted between the rind and pulp of a grapefruit to separate the pulp from the rind, a slicing blade extending at right angles to the plane of the other blade to slice the pulp as the other blade is inserted between the rind and pulp.

2. A grapefruit coring and slicing device comprising an offset shank, a tubular handle projecting from one end of said shank, said tubular handle having a sharpened end, a cutting member extending diametrically across said sharpened end, a spoon-shaped blade extending from the other end of the shank in substantially the same direction as the shank, a slicing blade extending longitudinally and centrally of the spoon-shaped blade and projecting at right angles to the plane thereof.

3. As an article of manufacture a corer and slicer for citrus fruits comprising a tubular handle sharpened at one of its ends for the removal of cores from fruit and having a slicing device extending from its other end, said slicing device comprising a blade for separating the pulp from the rind, and a blade for slicing the pulp.

RALSTON SMITH.